(12) United States Patent
Tanaka

(10) Patent No.: US 6,525,796 B2
(45) Date of Patent: Feb. 25, 2003

(54) LIQUID-CRYSTAL DISPLAY DEVICE

(75) Inventor: Yasuharu Tanaka, Fukaya (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 59 days.

(21) Appl. No.: 09/883,197

(22) Filed: Jun. 19, 2001

(65) Prior Publication Data

US 2001/0052953 A1 Dec. 20, 2001

(30) Foreign Application Priority Data

Jun. 20, 2000 (JP) .................................. 2000-184991

(51) Int. Cl.$^7$ ............................................. G02F 1/1333
(52) U.S. Cl. ............................. 349/138; 349/97; 349/38
(58) Field of Search .......................... 349/138, 63, 61, 349/97, 38

(56) References Cited

U.S. PATENT DOCUMENTS 5,682,211 A * 10/1997 Yao et al. ..................... 349/38
5,994,721 A * 11/1999 Zhong et al. ................ 257/89
6,326,641 B1 * 12/2001 Choi ............................ 257/57
6,372,534 B1 * 4/2002 den Boer et al. ........... 438/30

* cited by examiner

Primary Examiner—Toan Ton
Assistant Examiner—Hoan Nguyen
(74) Attorney, Agent, or Firm—Pillsbury Winthrop LLP

(57) ABSTRACT

An array substrate includes a wiring section, switching elements, an insulating film formed so as to cover the wiring section and switching elements, and pixel electrodes formed in a matrix on the insulating film and connected to the switching elements through contact holes made in the insulating film. If the thickness of the insulating film provided between the wiring section and the pixel electrodes is c, the refractive index of the insulating film is $n_{ins}$, the thickness of the liquid-crystal composition layer is d, the refractive index of the liquid-crystal composition is $n_{LC}$, and the angle at which the luminance in the direction of azimuth of the backlight unit becomes half of the front luminance is θ, the amount a of overlap of the wiring section with the pixel electrodes is expressed as:

$a \geq c \cdot \tan[\sin^{-1}\{(1/n_{ins})\sin \theta\}]$ $+ (\frac{1}{2})d \cdot \tan[\sin^{-1}\{(1/n_{LC})\sin \theta\}]$ 6 Claims, 3 Drawing Sheets

LIQUID-CRYSTAL DISPLAY DEVICE

CROSS-REFERENCE TO RELATED APPLICATIONS

This application is based upon and claims the benefit of priority from the prior Japanese Patent Application No. 2000-184991, filed Jun. 20, 2000, the entire contents of which are incorporated herein by reference.

BACKGROUND OF THE INVENTION

This invention relates to a liquid-crystal display device, and more particularly to a liquid-crystal display device capable of improving display quality.

In recent years, liquid-crystal display devices, active-matrix liquid-crystal optoelectronic elements using thin-film transistors, have been widely used. Although these liquid-crystal display devices have a relatively small screen size with a diagonal length of up to about 50 cm, they have been used as display elements in notebook personal computers, personal digital assistants, pocket-sized televisions because of light weight, thinness, and low power consumption. As for display devices having a large screen with a diagonal length of up to about 250 cm, projection display devices using the liquid-crystal display devices as light bulbs have been used.

A color-display active-matrix liquid-crystal display widely used at present is such that a liquid-crystal composition is sandwiched between two substrates having electrodes, the periphery of the pair of substrates excluding the liquid crystal injection opening is fixed with adhesive, and then the liquid crystal injection opening is sealed with sealer. One substrate, or the array substrate, includes a plurality of scanning lines and signal lines arranged so as to cross at right angles, thin-film transistors using amorphous silicon (a-Si) as semiconductor layers arranged near the intersections of the scanning lines and signal lines, and pixel electrodes connected to the thin-film transistors. The other substrate, or the counter substrate, includes the counter electrodes facing the plurality of pixel electrodes and a color filter layer composed of colored layers of the three primary colors (red (R), green (G), and blue (B)). The liquid-crystal display device is, for example, of the TN type, STN type, GH type, or ECB type. Alternatively, it may be composed of ferroelectric liquid crystal. On both sides of the pair of substrates, polarizing plates are provided. At the back of the array substrate, a backlight unit is provided.

One of the problems regarding the performance of such a liquid-crystal display device is an improvement in transmittance. In the above-mentioned active matrix liquid-crystal display device, to improve transmittance, the aperture ratio has only to be improved. To do this, the size of the pixel electrode of each pixel is made greater. Since the scanning lines and signal lines are provided around the pixel electrodes, each pixel electrode cannot be made wider without any restriction. A known pixel overlying structure to avoid this problem is such that an insulating film is provided between the scanning lines and signal lines and the pixel electrodes on the array substrate, thereby allowing the pixel electrodes to overlap with the signal lines or scanning lines. Since the signal lines and scanning lines are made of shading metal in a liquid-crystal display device with the pixel overlying structure, they act as a black matrix that shields one pixel electrode from another. This makes it unnecessary to form a black matrix on the counter substrate side.

When the pixel overlying structure liquid-crystal device is viewed obliquely, however, surface irregularities are seen, causing the problem of decreasing display quality. The result of analyzing this problem showed that, when the liquid-crystal display device was viewed at an angle of inclination larger than a specific value, part of the light passing through around the pixel electrodes was seen. Furthermore, since the amount of overlap of the pixel electrodes with the signal lines or scanning lines varied subtly, the amount of light passing through around the pixel electrodes varied. Thus, the result also showed that the variations in the amount of the passing light were recognized as display irregularities.

BRIEF SUMMARY OF THE INVENTION

It is, accordingly, an object of the present invention to provide a liquid-crystal display device capable of alleviating a decrease in display quality even when the display device is viewed obliquely.

The foregoing object is accomplished by providing a liquid-crystal display device comprising: a liquid-crystal display panel with a liquid-crystal composition sandwiched between first and second substrates forming a pair; and a backlight unit for illuminating the liquid-crystal display panel from behind, wherein the first substrate includes a wiring section, switching elements, an insulating film formed so as to cover the wiring section and the switching elements, and pixel electrodes formed in a matrix on the insulating film and connected to the switching elements through contact holes made in the insulating film, and where the thickness of the insulating film provided between the wiring section and the pixel electrodes is c, the refractive index of the insulating film is $n_{ins}$, the thickness of the liquid-crystal composition layer is d, the refractive index of the liquid-crystal composition is $n_{LC}$, and the angle at which the luminance in the direction of azimuth of the backlight unit becomes half of the front luminance is θ, the amount a of overlap of the wiring section with the pixel electrodes is expressed as:

$$a \geq c \cdot \tan[\sin^{-1}\{(1/n_{ins})\sin\theta\}]$$
$$+ (\tfrac{1}{2})d \cdot \tan[\sin^{-1}\{(1/n_{LC})\sin\theta\}]$$

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Hereinafter, referring to the accompanying drawings, an embodiment of a liquid-crystal display device according to the present invention will be explained.

Figure 1:
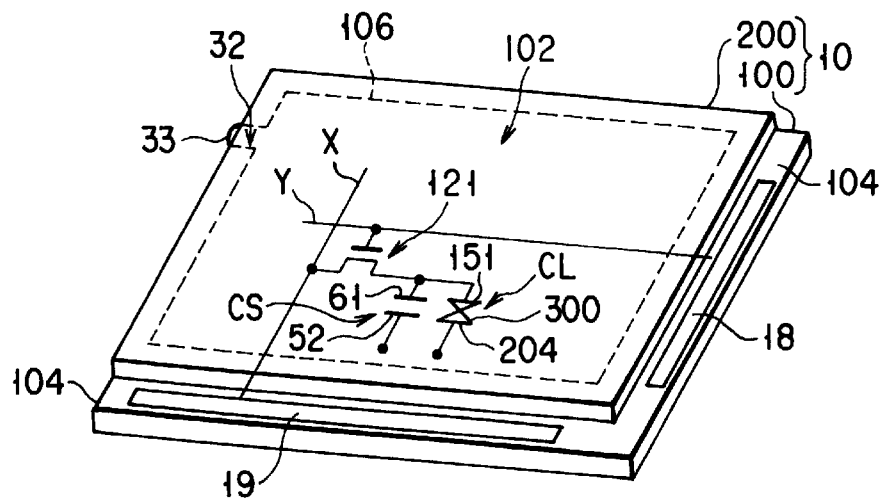
FIG. 1 schematically shows the configuration of a liquid-crystal display panel applied to a liquid-crystal display device according to the present invention.
Figure 2:
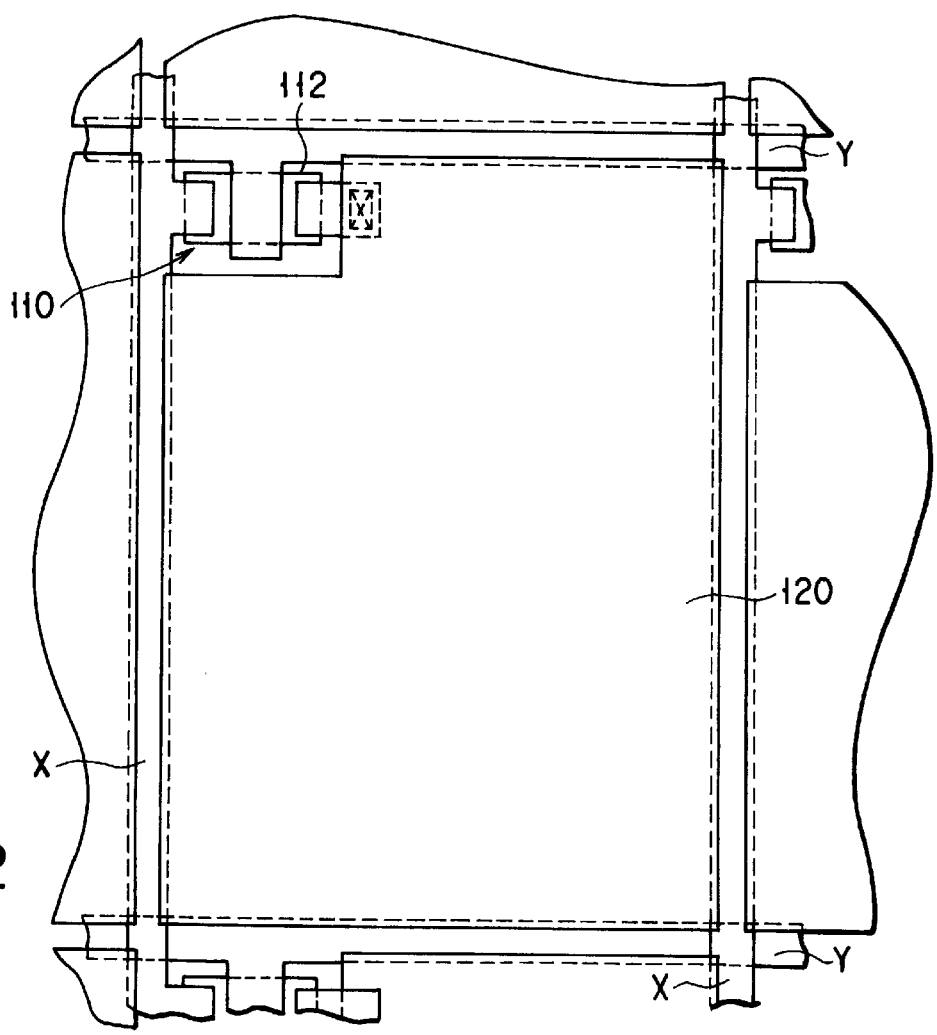
FIG. 2 is a plan view schematically showing the array substrate structure of a pixel in the liquid-crystal display panel of FIG. 1.
Figure 3:
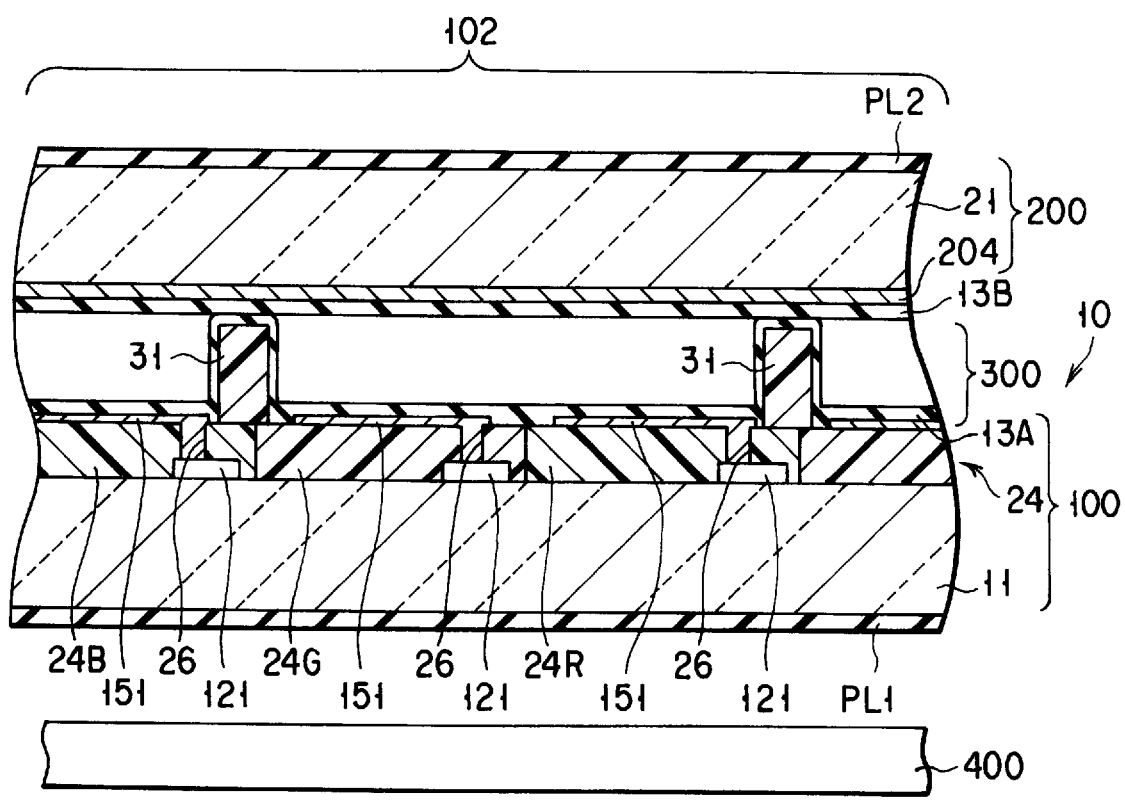
FIG. 3 is a sectional view schematically showing the configuration of the liquid-crystal display device according to the present invention.

As shown in FIGS. 1 to 3, a liquid-crystal display device of the present invention, such as an active-matrix-type liquid-crystal display device, comprises a transmission liquid-crystal display panel 10 and a backlight unit 400 for illuminating the liquid-crystal display panel 10 from behind.

The liquid-crystal display panel 10 includes an array substrate 100, a counter substrate 200 provided in the opposite position to the array substrate 100, and a liquid-crystal composition 300 sandwiched between the array substrate 100 and counter substrate 200. In the liquid-crystal display panel 10, a display area 102 for displaying images is formed in an area enclosed by an outer periphery seal member 106 that laminates the array substrate 100 and the counter substrate 200 together.

In the display area 102, the array substrate 100 includes pixel electrodes 151, scanning lines Y, signal lines X, switching elements 121, a color filter layer 24, pillar-like spacers 31, and an aligning film 13A.

An m number of scanning lines Y are arranged in the direction of row of the pixel electrodes 151. The scanning lines Y are made of shading metal. An n number of signal lines X are arranged in the direction of column of the pixel electrodes 151. The signal lines X are made of shading metal. The signal lines X are provided on a gate insulating film 60 that covers the scanning lines Y.

Pixel TFTs 121 (thin-film transistors) that function as an m×n number of switching elements are placed near the intersections of the scanning lines Y and the signal lines X in such a manner that they correspond to the m×n number of pixel electrodes 151. Each pixel TFT 121 is composed of a semiconductor layer made of a polysilicon film, a gate electrode connected to a scanning line Y, a drain electrode connected to a signal line X, and a source electrode connected to a pixel electrode 151.

The color filter layer 24 functions as an insulating film that electrically insulates the wiring section (including the scanning lines Y, signal lines X, and auxiliary capacitance lines 52) from the pixel electrodes 151. The color filter layers 24 (R, G, B) are composed of transmitting layers each colored with red, green, and blue, respectively. The color filter layer 24 of a specific color is provided for each pixel area enclosed by the scanning lines Y and signal lines X. The wiring section is placed at the boundary of each color filter layer 24.

The m×n number of pixel electrodes 151 are arranged in a matrix for each pixel area on the color filter layer 24. The pixel electrodes 151 are made of a transmitting conductive member, such as ITO (indium tin oxide). Each of the pixel electrodes 151 is connected to a pixel TFT 121 via a through-hole 26 bored through the color filter layer 24. The pixel electrode 151 is provided in such a manner that part of its periphery overlaps with the wiring section.

The pillar-like spacers 31 are formed on the color filter layer 24. The pillar-like spacers 31 are made of, for example, transparent resin. In the display area 102, the pillar-like spacers 31 are provided on the shading wiring section via an insulating film, or the color filter layer 24 (R, G, B).

The aligning film 13A is formed so as to cover all the pixel electrodes 151. The aligning film 13A aligns the liquid-crystal molecules 310 contained in the liquid-crystal composition 300 in the direction substantially parallel with the array substrate 100. That is, the aligning film 13A is designed to cause the liquid-crystal molecules 310 to have a slight pre-tilt angle to the main surface of the substrate.

In a peripheral area 104 provided along the periphery of the display area 102, the array substrate 100 includes a scanning line driving circuit 18 for driving the scanning lines Y and a signal line driving circuit 19 for driving the signal lines X.

A liquid-crystal capacitance CL is composed of a pixel electrode 151, a counter electrode 204, and a liquid-crystal layer 300 sandwiched between these electrodes. An auxiliary capacitance Cs is formed electrically in parallel with the liquid-crystal capacitance CL. The auxiliary capacitance Cs is composed of a pair of electrodes provided so that they face each other with an insulating film between them. Specifically, the auxiliary capacitance Cs is composed of an auxiliary capacitance electrode 61 of the same potential as that of the pixel electrode 151 and an auxiliary capacitance line 52 set at a specific potential. The auxiliary capacitance electrode 61 is provided on the same layer as the semiconductor layer of the pixel TFT 121. The auxiliary capacitance line 52 is provided on the same layer as that of the scanning lines Y.

The wiring section including the signal lines X, scanning lines Y, and auxiliary capacitance lines 52 is composed of a shading low-resistance material, such as a simple substance of, for example, tantalum (Ta), chromium (Cr), aluminum (Al), molybdenum (Mo), tungsten (W), or copper (Cu), or a stacked film of these materials, or an alloy film of these materials. In the embodiment, the scanning lines Y and auxiliary capacitance lines 52 are made of molybdenum-tungsten and the signals lines X are made mainly of aluminum. Since the shading wiring section is provided so as to overlap with the peripheral section of the pixel electrodes 151, it prevents light from passing through around the pixel electrodes 151 and therefore functions as a black matrix.

The counter substrate 120 includes a counter electrode 22 formed on a transparent insulating substrate 21, such as a glass substrate, and an aligning film 13B that covers the counter electrode 22.

The counter electrode 22 is made of a transmitting conductive member, such as ITO, provided so as to face all the pixel electrodes 151 located on the array substrate 110 side.

The aligning film 13B aligns the liquid-crystal molecules 310 contained in the liquid-crystal composition 300 in the direction substantially parallel with the array substrate 100. That is, the aligning film 13B is designed to cause the liquid-crystal molecules 310 to have a slight pre-tilt angle to the main surface of the substrate.

The array substrate 100 and counter substrate 200 are laminated together with a periphery seal member 106 printed along the periphery of the substrate in such a manner that the seal member is applied so as to surround the liquid-crystal housing space excluding a liquid-crystal injection opening 32. The periphery seal member 106 is made of, for example, thermoset epoxy resin adhesive. An electrode transfer material is provided on transfer electrodes around the periphery seal member 106 to apply a voltage from the array substrate 100 side to the counter electrode 200 side. The liquid-crystal composition 300 is injected from the liquid-crystal injection opening 32. The liquid-crystal injection opening 32 is sealed with an injection opening seal member 33 made of thermoset epoxy resin adhesive.

In the liquid-crystal display panel 10, a polarizing plate PL1 is provided on the surface of the array substrate 100 and a polarizing plate PL2 is provided on the surface of the counter substrate 200.

In the liquid-crystal display device with the above-described pixel overlying structure, light emitted from the backlight unit 400 passes through the polarizing plate PL1 on the array substrate 100 side and enters the liquid-crystal display panel 10. The light incident on the liquid-crystal display panel 10 passes through the insulating films including the color filter layer 24, the pixel electrodes 151, and the aligning film 13A formed on the array substrate 100 and enters the liquid-crystal composition 300. At this time, the spacing between the adjacent pixel electrodes 151 are shielded by the wiring section, including the signal lines X and scanning lines Y. The light passed through the liquid-crystal composition 300, which modulates it. The modulated light passes through the aligning film 13B and counter electrode 204 formed on the counter substrate 200 and then is selectively transmitted by the polarized plate PL2, with the result that a color image is displayed.

In the liquid-crystal display device, the amount a of overlap of the pixel electrodes 151 with the wiring section is set so as to meet the following condition. If the thickness of the insulating film provided between the pixel electrode 151 and the wiring section is c, the refractive index of the insulating film is $n_{ins}$, the thickness of the layer of the liquid-crystal composition 300 is d, the refractive index of the liquid-crystal composition 300 to ordinary rays is $n_{LC}$, and the angle at which the luminance in the direction of azimuth of the backlight unit 400 becomes half of the front luminance is θ, the amount a of overlap is set to fulfill the following expression:

$$a \geq c \cdot \tan[\sin^{-1}\{(1/n_{ins})\sin\theta\}]$$
$$+ (\tfrac{1}{2})d \cdot \tan[\sin^{-1}\{(1/n_{LC})\sin\theta\}]$$

Figure 4:
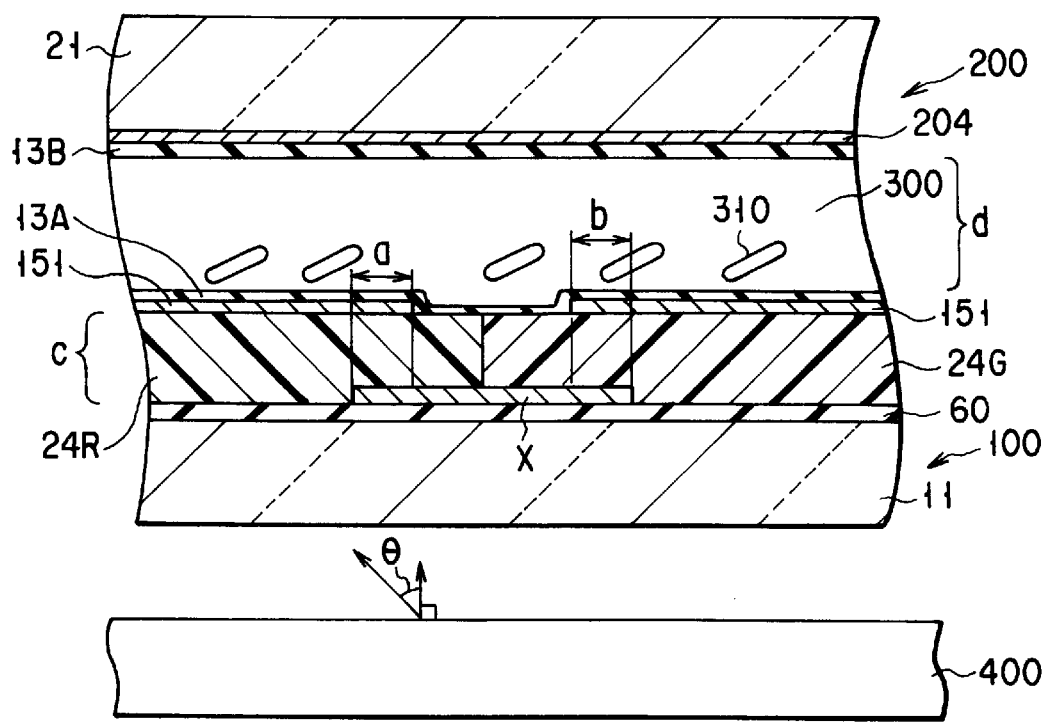
FIG. 4 is a schematic sectional view to explain the amount of overlap of the wiring section (the scanning lines or signal lines) with the pixel electrodes in the liquid-crystal display device of FIG. 1.

For instance, as shown in FIG. 4, the amount a of overlap of the pixel electrodes 151 with the signal lines X is set as follows. It is assumed that the thickness c of the insulating film provided between the pixel electrodes 151 and the signal lines X, that is, the color filter layer 24, is 3 μm, the refractive index $n_{ins}$ of the color filter layer 24 is 1.51, the thickness d of the liquid-crystal composition layer 300 is 5 μm, the refractive index $n_{LC}$ of the liquid-crystal composition layer 300 to ordinary rays is 1.5, and the angle θ at which the luminance in the direction of azimuth perpendicular to the signal lines X of the backlight unit 400 becomes half of the front luminance is 20°. Substituting these values into the above expression gives:

$$a \geq 1.28$$

In the liquid-crystal display device of the embodiment, the amount of overlap of the signal lines X with the pixel electrodes 151 was set to a=2 μm. As a result, display irregularities were inconspicuous even when the liquid-crystal display device with the pixel overlying structure was viewed obliquely, which improved the display quality.

Figure 5:
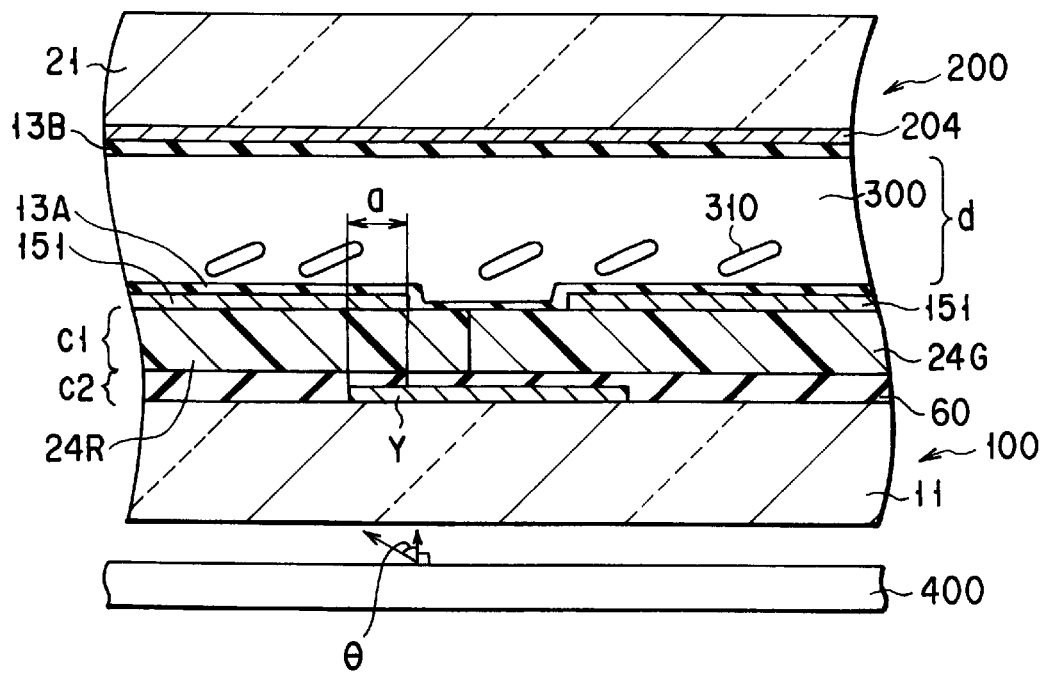
FIG. 5 is a schematic sectional view to explain the amount of overlap of the wiring section (the scanning lines or signal lines) with the pixel electrodes in the liquid-crystal display device of FIG. 1.

For instance, as shown in FIG. 5, the amount a of overlap of the pixel electrodes 151 with the scanning lines Y is set as follows. It is assumed that the thickness c1 of the insulating film provided between the pixel electrodes 151 and the scanning lines Y, that is, the gate insulating film 60, is 0.3 μm, the thickness c2 of the color filter layer 24 is 3 μm, the refractive index $n_{ins}1$ of the gate insulating film 60 is 1.85, the refractive index $n_{ins}2$ of the color filter layer 24 is 1.51, the thickness d of the liquid-crystal composition layer 300 is 5 μm, the refractive index $n_{LC}$ of the liquid-crystal composition layer 300 to ordinary rays is 1.5, and the angle θ at which the luminance in the direction of azimuth perpendicular to the signal lines X of the backlight unit 400 becomes half of the front luminance is 20°. At this time, the amount a of overlap of the scanning lines Y with the pixel electrodes 151 is set so as to fulfill the following expression:

$$a \geq c1 \cdot \tan[\sin^{-1}\{(1/n_{ins}1)\sin\theta\}]$$
$$+ c2 \cdot \tan[\sin^{-1}\{(1/n_{ins}2)\sin\theta\}]$$
$$+ (\tfrac{1}{2})d \cdot \tan[\sin^{-1}\{(1/n_{LC})\sin\theta\}]$$

Substituting these values into the above expression gives the amount a of the scanning lines Y with the pixel electrodes 151:

$$a \geq 1.34$$

In the liquid-crystal display device of the embodiment, the amount of overlap of the scanning lines X with the pixel electrodes 151 was set to a=2 μm. As a result, display irregularities were inconspicuous even when the liquid-crystal display device with the pixel overlying structure was viewed obliquely, which improved the display quality. In a case where the auxiliary capacitance line 52 and pixel electrode 151 are provided in such a manner that they overlap with each other, since the auxiliary capacitance line 52 is provided on the same layer as that of the scanning line Y, the insulating layer provided between the auxiliary capacitance line 52 and pixel electrode 151 is the gate insulating film 60 and color filter layer 24. In this case, the display quality can be improved by setting the amount a of overlap so as to meet the same condition as for the scanning lines Y.

On the other hand, the liquid-crystal molecules 310 located on the pixel electrodes 151 near the array substrate 100 side are almost parallel with the main surface of the substrate. The aligning film 13A aligns the liquid-crystal molecules 310 so that they may have a slight pre-tilt angle to the main surface of the substrate. On the side where the liquid-crystal molecules 310 are closer to the pixel electrodes 151, the amount b of overlap of the pixel electrodes 151 with the wiring section is set so as to fulfill the following expression:

$$b \geq a+1$$

For instance, as shown in FIG. 4, the amount a of overlap of the pixel electrodes 151 with the signal lines X is set as follows. It is assumed that the thickness c of the insulating film provided between the pixel electrodes 151 and the signal lines X, that is, the color filter layer, is 3 μm, the refractive index $n_{ins}$ of the color filter layer 24 is 1.51, the thickness d of the liquid-crystal composition layer 300 is 4.5 μm, the refractive index $n_{LC}$ of the liquid-crystal composition layer 300 to ordinary rays is 1.55, and the angle θ at which the luminance in the direction of azimuth perpendicular to the signal lines X of the backlight unit 400 becomes half of the front luminance is 30°. Substituting these values into the above expression gives:

$$b \geq a(=1.82)+1$$

In the liquid-crystal display device of the embodiment, the amount of overlap of the signal lines X with the pixel electrodes 151 was set to a=2 μm in the area where the liquid-crystal molecules were not close to the pixel electrodes 151, whereas the amount of overlap of the signal lines X with the pixel electrodes 151 was set to b=3 μm in the area where the pre-tilt angle made the liquid-crystal molecules 310 closer to the surface of the pixel electrodes 151. As a result, display irregularities were inconspicuous even when the liquid-crystal display device with the pixel overlying structure was viewed obliquely, which improved the display quality.

As described above, when a plurality of insulating layers are provided between the pixel electrodes 151 and the wiring section in determining the amount of the overlap of the pixel electrode 151 with the wiring section, let the thickness of a first insulating layer provided between the pixel electrodes and the wiring section be c1, the thickness of a second insulating layer be c2, the thickness of an N-th insulating layer be cN, the refractive index of the first insulating layer be $n_{ins}1$, the refractive index of the second insulating layer be $n_{ins}2$, the refractive index of the N-th insulating layer be $n_{ins}N$, the thickness of the liquid-crystal composition layer be d, the refractive index of the liquid-crystal composition layer to ordinary rays is $n_{LC}$, and the angle at which the luminance in the direction of azimuth of the backlight unit becomes half of the front luminance is θ. At this time, the amount a of overlap of the pixel electrodes with the wiring section is set so as to fulfill the following expression:

$$a \geq c1 \cdot \tan[\sin^{-1}\{(1/n_{ins}1)\sin \theta\}]$$
$$+ c2 \cdot \tan[\sin^{-1}\{(1/n_{ins}2)\sin \theta\}] + \ldots$$
$$+ cN \cdot \tan[\sin^{-1}\{(1/n_{ins}N)\sin \theta\}]$$
$$+ (\tfrac{1}{2})d \cdot \tan[\sin^{-1}\{(1/n_{LC})\sin \theta\}]$$

As explained above, with the present invention, it is possible to provide a liquid-crystal display device capable of alleviating a decrease in the display quality even when viewed obliquely.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid-crystal display device comprising:
   a liquid-crystal display panel with a liquid-crystal composition sandwiched between first and second substrates forming a pair; and
   a backlight unit for illuminating said liquid-crystal display panel from behind, wherein
      said first substrate includes a wiring section, switching elements, an insulating film formed so as to cover said wiring section and said switching elements, and pixel electrodes formed in a matrix on said insulating film and connected to said switching elements through contact holes made in said insulating film, and
      where the thickness of said insulating film provided between said wiring section and said pixel electrodes is c, the refractive index of said insulating film is $n_{ins}$, the thickness of said liquid-crystal composition layer is d, the refractive index of said liquid-crystal composition is $n_{LC}$, and the angle at which the luminance in the direction of azimuth of said backlight unit becomes half of the front luminance is θ, the amount a of overlap of said wiring section with said pixel electrodes is expressed as:

$$a \geq c \cdot \tan[\sin^{-1}\{(1/n_{ins})\sin \theta\}]$$
$$+ (\tfrac{1}{2})d \cdot \tan[\sin^{-1}\{(1/n_{LC})\sin \theta\}].$$

2. The liquid-crystal display device according to claim 1, wherein said first substrate includes an aligning film for aligning the liquid-crystal molecules contained in said liquid-crystal composition so that they may be substantially parallel with each other at a specific pre-tilt angle to the main surface of the substrate, and
   the amount b of overlap of said wiring section with the pixel electrodes on the side where the liquid-crystal molecules are closer to the pixel electrodes meets the following expression:

$$b \geq a+1 .$$

3. The liquid-crystal display device according to claim 1, wherein said wiring section is composed of signal lines.

4. The liquid-crystal display device according to claim 1, wherein said wiring section is composed of scanning lines.

5. The liquid-crystal display device according to claim 1, wherein said wiring section is so provided that it corresponds to the spaces between adjacent said pixel electrodes and is made of shading metal material.

6. The liquid-crystal display device according to claim 1, wherein said first and second substrates has an aligning film on either of their sides sandwiching said liquid-crystal composition between them.

* * * * *